United States Patent
Hosaka

(10) Patent No.: US 9,457,561 B2
(45) Date of Patent: Oct. 4, 2016

(54) IMAGE FORMING APPARATUS, IMAGE PROCESSING METHOD, AND PROGRAM RECORDING MEDIUM

(71) Applicant: Shigetoshi Hosaka, Kanagawa (JP)

(72) Inventor: Shigetoshi Hosaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/042,454

(22) Filed: Feb. 12, 2016

(65) Prior Publication Data

US 2016/0236462 A1 Aug. 18, 2016

(30) Foreign Application Priority Data

Feb. 16, 2015 (JP) .................................. 2015-027904
Jan. 18, 2016 (JP) .................................. 2016-007451

(51) Int. Cl.
| | | |
|---|---|---|
| B41J 2/045 | (2006.01) | |
| H04N 1/034 | (2006.01) | |
| B41J 29/393 | (2006.01) | |

(52) U.S. Cl.
CPC ........... *B41J 2/0451* (2013.01); *B41J 2/04586* (2013.01); *B41J 29/393* (2013.01); *H04N 1/034* (2013.01)

(58) Field of Classification Search
CPC .. B41J 2/04586; B41J 2/2139; B41J 29/393; B41J 2/04508; B41J 2/0451; B41J 2/145; H04N 1/405; H04N 1/034; G06K 15/102
See application file for complete search history.

(56) References Cited

U.S. PATENT DOCUMENTS

| | | |
|---|---|---|
| 2007/0085869 A1 | 4/2007 | Hirano et al. |
| 2007/0091135 A1 | 4/2007 | Hosaka et al. |
| 2008/0068412 A1 | 3/2008 | Kikuchi et al. |
| 2008/0117467 A1 | 5/2008 | Hosaka et al. |
| 2008/0123146 A1 | 5/2008 | Ike et al. |
| 2008/0137147 A1 | 6/2008 | Nakano et al. |
| 2009/0080002 A1 | 3/2009 | Nakano et al. |
| 2010/0141707 A1 | 6/2010 | Nakano et al. |
| 2010/0231631 A1 | 9/2010 | Hosaka et al. |
| 2011/0090276 A1 | 4/2011 | Hirano |
| 2011/0273746 A1 | 11/2011 | Hoshino et al. |
| 2012/0314259 A1 | 12/2012 | Hosaka |
| 2015/0254536 A1 | 9/2015 | Hosaka |
| 2015/0286908 A1* | 10/2015 | Shibata .................... H04N 1/52 358/3.06 |

FOREIGN PATENT DOCUMENTS

JP     2010-017918     1/2010

* cited by examiner

*Primary Examiner* — Thinh Nguyen

(74) *Attorney, Agent, or Firm* — Cooper & Dunham LLP

(57) ABSTRACT

An image forming apparatus includes an image forming device, a threshold comparator, a first image compensator, and a second image compensator. The first compensator executes a processing of, for at least a pixel value less than a threshold, setting a value of stopping discharge of a droplet from a defective nozzle in converting multi-valued data of an input image into n-value data, and spreading a quantization error due to setting the value, to neighboring pixels of a pixel corresponding to a defective nozzle. The second compensator executes a processing of replacing a smaller dot among dots around the defective nozzle with a larger dot by pattern matching using a mask pattern in accordance with a dot size and placement around the defective nozzle, on condition that as a result of comparison of the comparator, the pixel value corresponding to the defective nozzle is equal to or more than the threshold.

10 Claims, 9 Drawing Sheets

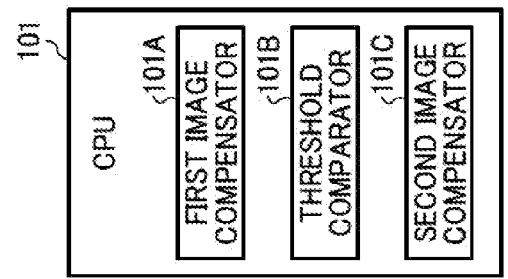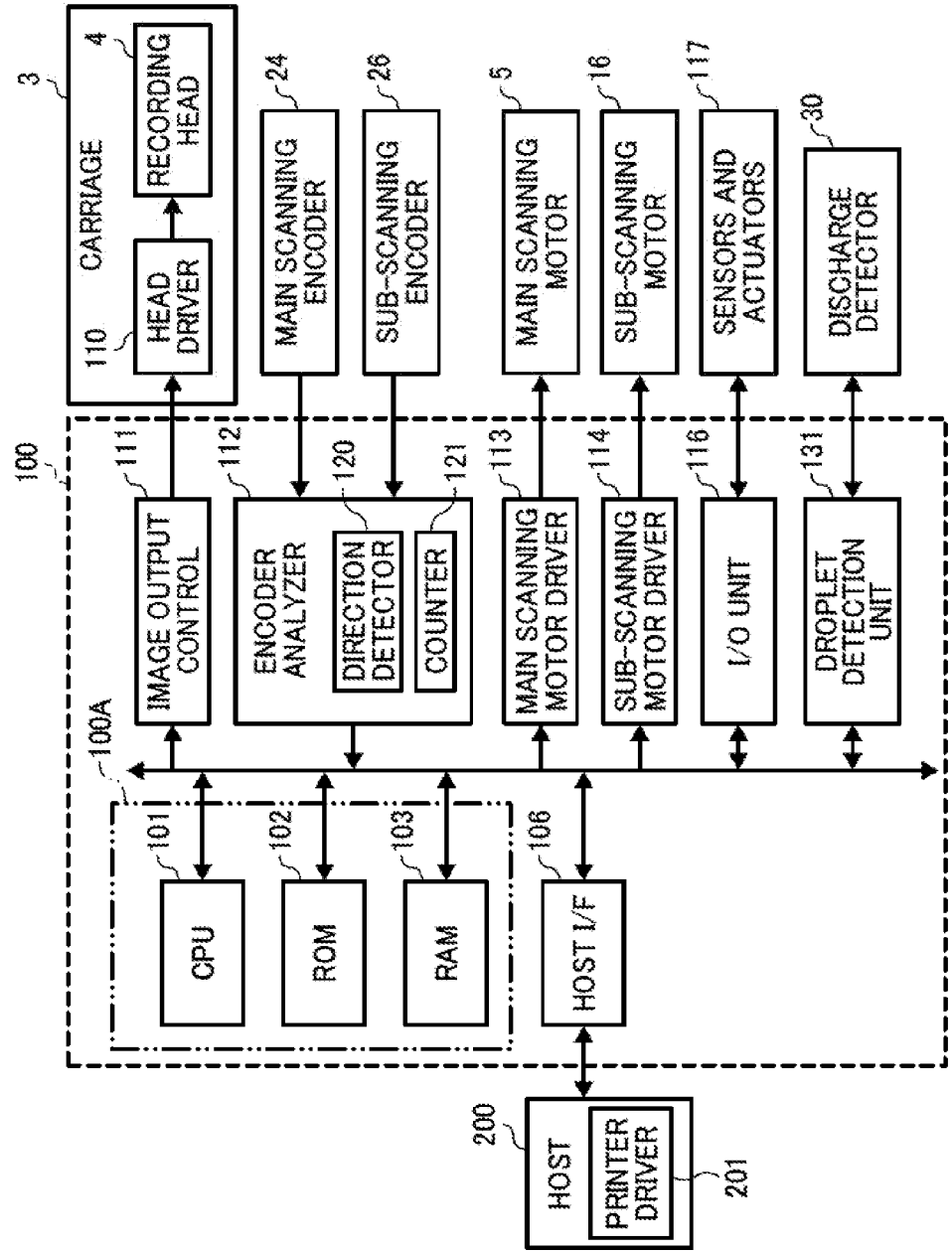

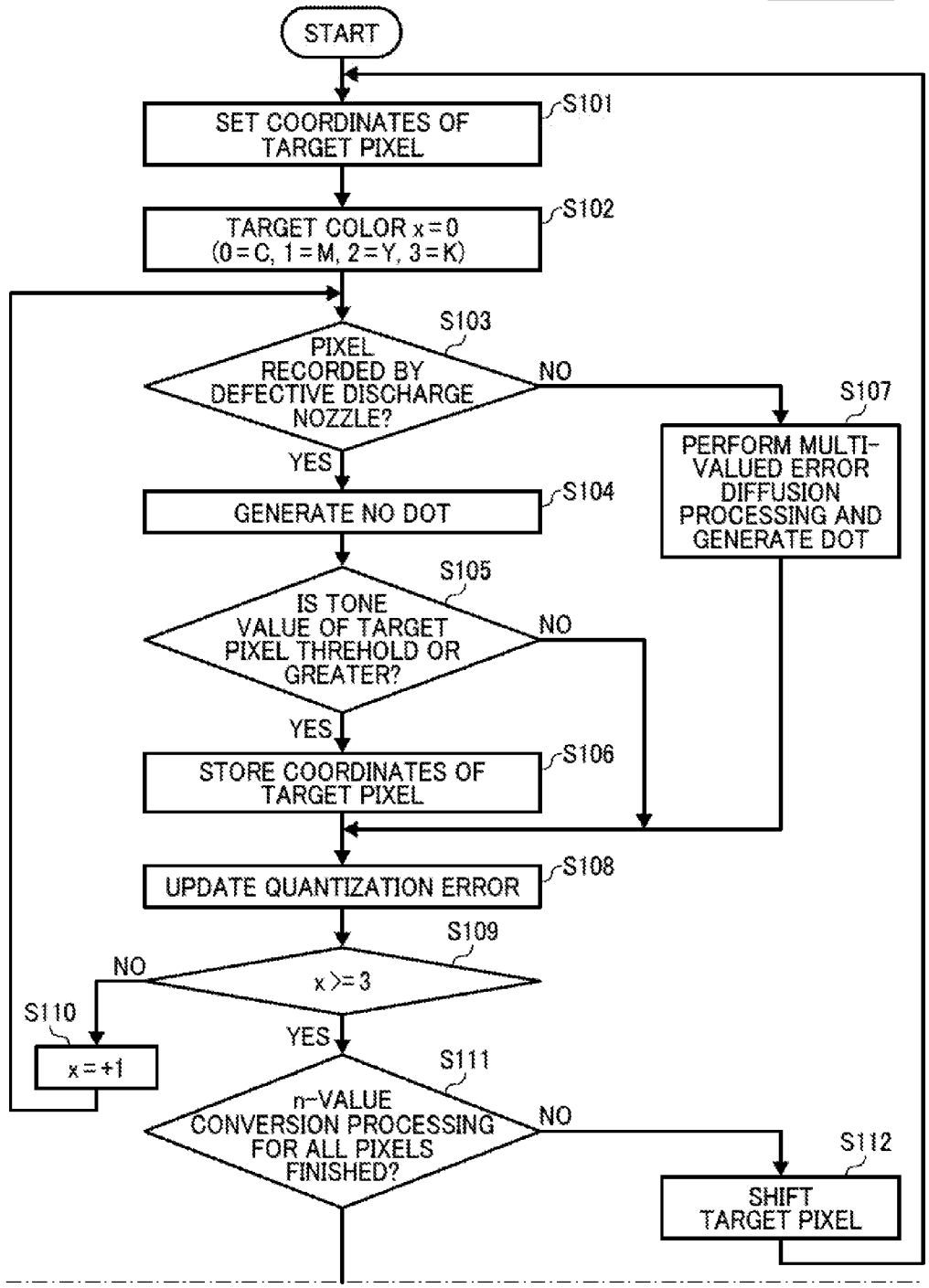

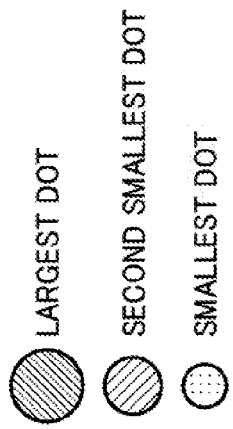
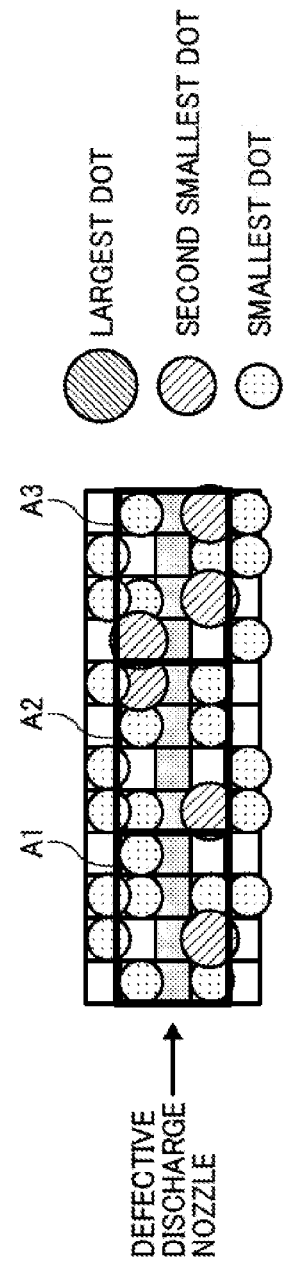
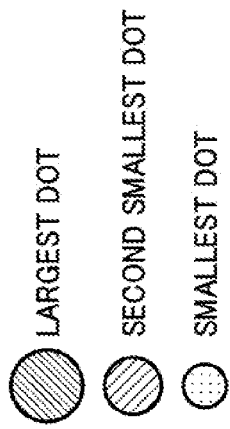
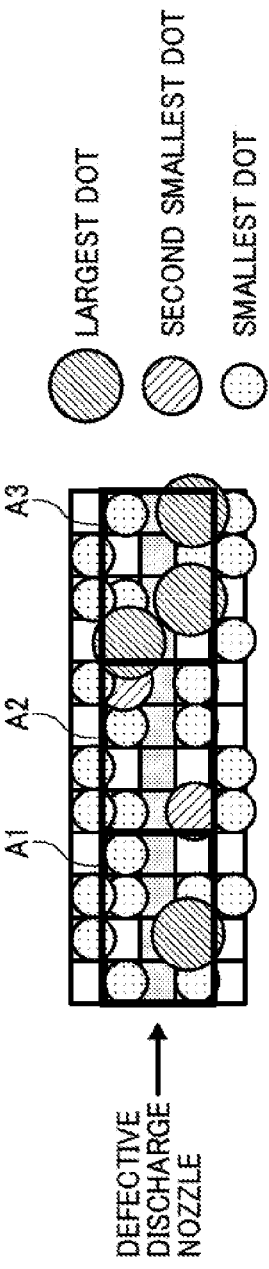
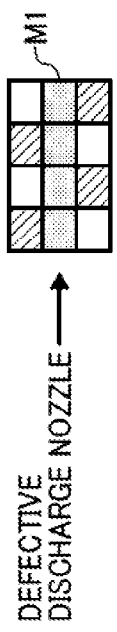
FIG. 5A
FIG. 5B
FIG. 5C

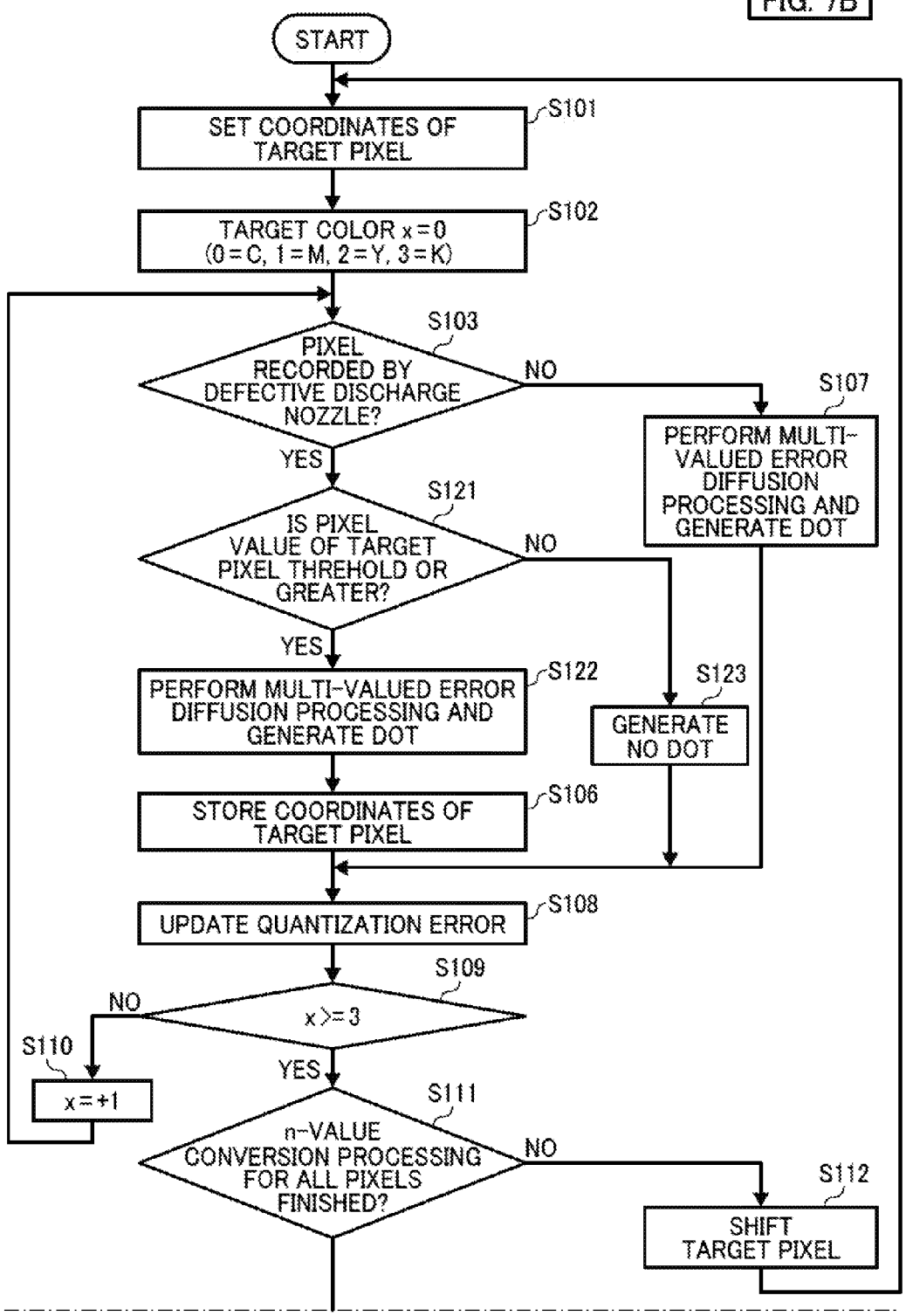

IMAGE FORMING APPARATUS, IMAGE PROCESSING METHOD, AND PROGRAM RECORDING MEDIUM

CROSS-REFERENCE TO RELATED APPLICATIONS

This patent application is based on and claims priority pursuant to 35 U.S.C. §119(a) to Japanese Patent Application Nos. 2015-027904, filed on Feb. 16, 2015, and 2016-007451, filed on Jan. 18, 2016 in the Japan Patent Office, the entire disclosure of each of which is hereby incorporated by reference herein.

BACKGROUND

1. Technical Field

Aspects of the present disclosure relate to an image forming apparatus, an image processing method, and a non-transitory program recording medium.

2. Related Art

In an inkjet printer that discharges liquid, e.g., ink from nozzles to form an image, "discharge failure" in which ink is not discharged from nozzles may occur due to clogging of nozzles with foreign substance, drying of ink, or the like. Hence, for example, a compensation method is proposed to detect whether or not an ink droplet is discharged normally from a nozzle, perform a different type of image processing from normal printing on input image data in accordance with the result of the detection, and accordingly compensate for image quality in order to prevent the degradation of the image quality even when there is a defective discharge nozzle.

SUMMARY

In an aspect of the present disclosure, there is provided an image forming apparatus that includes an image forming device, a threshold comparator, a first image compensator, and a second image compensator. The image forming device includes a recording head with nozzles to discharge a droplet to form an image on a recording medium. The threshold comparator is configured to compare a pixel value corresponding to a defective discharge nozzle, from which a droplet is not normally discharged, and a predetermined threshold. The first image compensator is configured to execute a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle. The second image compensator is configured to execute a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

In another aspect of the present disclosure, there is provided an image processing method. The method includes discharging a droplet from a nozzle of a recording head to form an image on a recording medium and comparing a pixel value corresponding to a defective discharge nozzle, from which a droplet is not normally discharged, and a predetermined threshold. The method further includes executing a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle; and executing a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

In another aspect of the present disclosure, there is provided a non-transitory computer-readable program recording medium storing a program for causing an image forming apparatus to execute an image processing method. The method includes discharging a droplet from a nozzle of a recording head to form an image on a recording medium and comparing a pixel value corresponding to a defective discharge nozzle, from which a droplet is not normally discharged, and a predetermined threshold. The method further includes executing a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle; and executing a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2A is a block diagram of a configuration of a controller of the image forming apparatus according to an embodiment of the present disclosure;

FIG. 2B is a functional block diagram of a main controller according to an embodiment of the present disclosure;

FIGS. 3A and 3B (collectively referred to as FIG. 3) are a flow chart of a procedure of image data compensation processing to be executed in the main controller based on a program when a defective discharge nozzle is detected, according to an embodiment of the present disclosure;

FIGS. 5A to 5C are illustrations of the replacement of dots by a mask pattern according to an embodiment of the present disclosure;

FIGS. 7A and 7B (collectively referred to as FIG. 7) are a flow chart of a procedure of a variation of the image data compensation processing illustrated in FIG. 3.

Figure 1:
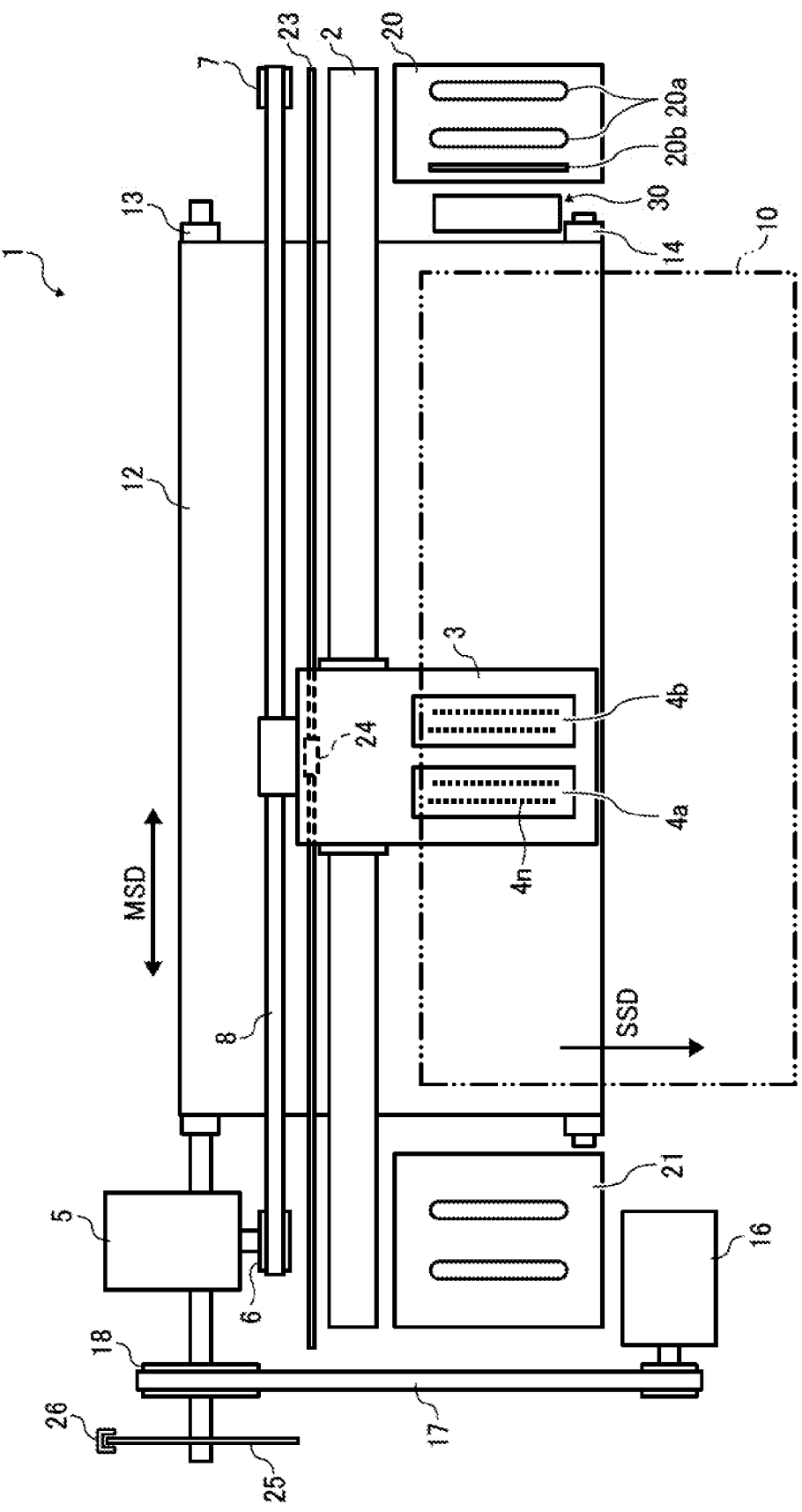
FIG. 1 is a plan view of a serial-type inkjet recording apparatus as an image forming apparatus according to one embodiment of the present disclosure.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An embodiment of the present disclosure will be described hereinafter. However, the embodiment includes the following features when image data is printed with a head including a defective discharge nozzle. In short, in the present embodiment, an input image is converted into a dot pattern (n-value data) by multi-valued error diffusion processing where multi-valued data of the input image is converted into n-value data (n≥2). It is set based on the discharge state from the nozzles of a recording head such that droplets are not discharged to part of pixels corresponding to recording positions of defective discharge nozzles from which a droplet cannot be discharged normally. Moreover, together with this, the following is performed: image processing to spread a quantization error in the multi-valued error diffusion processing as it is to neighboring pixels in accordance with a comparison result of the pixel value of a pixel corresponding to a recording pixel position of the defective discharge nozzle and a "switching threshold" to be set for each sheet according to the density of a print image, the dot density, and the like; and a pattern matching processing in accordance with the dot size (for example, a large droplet, a medium droplet, or a small droplet) and placement around the defective discharge nozzle at equal to or more than a tone that causes the degradation of image quality because the compensation processing cannot be performed only on a downstream side of the defective discharge nozzle in multi-valued error diffusion processing. Accordingly, it is switched to image processing to replace the dot size and placement to enable the application of image processing that has a high compensation effect at all the tones.

The embodiment of the present disclosure will be described below with reference to the drawings. Firstly, FIG. 1 is a plan view of a serial-type inkjet recording apparatus as an image forming apparatus according to one embodiment of the present disclosure. Note that here, in a serial-type inkjet recording apparatus 1, a direction to move a carriage is referred to as main-scanning direction (MSD), and a direction to convey a medium as sub-scanning direction (SSD). Therefore, unless otherwise specified, the left-and-right direction in image data is called a "main-scanning direction," and the up-and-down direction is called a "sub-scanning direction."

A carriage 3 is held movably by a main guide 2 and a sub guide that laterally bridge left and right side plates of the serial-type inkjet recording apparatus 1. The carriage 3 reciprocally moves in the main-scanning direction (indicated by arrow MSD in FIG. 1) by a main-scanning motor 5 via a timing belt 8 running between a drive pulley 6 and a driven pulley 7.

Recording heads 4 (4a, 4b) each including a liquid discharge head are mounted in the carriage 3. The recording head 4 discharges ink droplets of respective colors such as Y (yellow), C (cyan), M (magenta), and K (black). The recording head 4 is mounted, placing nozzle rows 4n each including a plurality of nozzles in the sub-scanning direction (indicated by arrow SSD in FIG. 1) perpendicular to the main-scanning direction MSD, and aiming a droplet discharge direction downward.

The recording heads 4a and 4b each include two nozzle rows in each of which the plurality of nozzles is aligned. For example, one of the nozzle rows of the recording head 4a discharges droplets of K, and the other nozzle row discharges droplets of C. One of the nozzle rows of the recording head 4b discharges droplets of M, and the other nozzle row discharges droplets of Y. For example, piezoelectric actuators such as piezoelectric elements, and thermal actuators that use a phase change caused by film boiling of a liquid with use of an electrothermal transducer such as a heating resistor can be used as the liquid discharge heads constituting the recording heads 4a and 4b.

The serial-type inkjet recording apparatus 1 includes an endless conveyance belt 12 as a conveyor for electrostatically attracting a sheet of paper 10 and conveying the sheet at a position opposed to the recording head 4 (4a, 4b). The conveyance belt 12 runs between a conveyance roller 13 and a tension roller 14. The conveyance roller 13 is driven and rotated by a sub-scanning motor 16 via a timing belt 17 and a timing pulley 18. The conveyance belt 12 is driven by the conveyance roller 13 to circulate in the sub-scanning direction SSD. The conveyance belt 12 is charged (takes on an electric charge) by a charging roller upon circulation.

On one side in the main-scanning direction of the carriage 3, a maintenance-and-recovery device (hereinafter, maintenance device) 20 that maintains and recovers the recording head 4 is placed on the side of the conveyance belt 12. On the other side, a dummy discharge receptacle 21 for flushing the recording head 4 is placed on the side of the conveyance belt 12. Not only the conveyance belt 12 that uses electrostatic attraction but also a conveyor that uses a platen for supporting the sheet 10 and the conveyance roller 13 for conveying the sheet 10 may be used as a unit for conveying the sheet 10. In this case, instead of the tension roller 14, the conveyance roller 13 is used also on a paper ejection side. The sheet 10 is conveyed in contact with the conveyance rollers 13 on both a paper feeding side and the paper ejection side. Moreover, in addition to the conveyance belt 12 that uses electrostatic attraction, a unit for conveying the sheet 10 with use of a suction unit that uses air suction that sucks air through a hole made in the platen can also be used.

The maintenance device 20 includes, for example, a cap 20a that caps a nozzle face of the recording head 4, a wiper 20b that wipes the nozzle face, and a dummy discharge receptacle for discharging droplets that do not contribute to image formation. Moreover, a discharge detector 30 is placed in an area opposable to the recording head 4 outside a recording area between the conveyance belt 12 and the maintenance device 20.

An encoder scale 23 where a predetermined pattern is formed is placed between both side plates along the main-scanning direction of the carriage 3. On the other hand, the carriage 3 is provided with a main-scanning encoder sensor 24 including a transmissive photosensor that reads the pattern of the encoder scale 23. The encoder scale 23 and the main-scanning encoder sensor 24 constitute a linear encoder (main-scanning encoder) that detects the movement of the carriage 3.

A code wheel 25 is attached to a shaft of the conveyance roller 13. On the other hand, a sub-scanning encoder sensor 26 including a transmissive photosensor that detects a pattern formed on the code wheel 25 is provided in such a manner as to hold the rim of the code wheel 25. The code wheel 25 and the sub-scanning encoder sensor 26 constitute a rotary encoder (sub-scanning encoder) that detects the movement amount and moved position of the conveyance belt 12.

In the serial-type inkjet recording apparatus 1 constituted as described above, the sheet 10 fed from a sheet feed tray is conveyed in the sub-scanning direction by the circulation of the conveyance belt 12 while being suctioned to the charged conveyance belt 12. When the sheet 10 arrives at a predetermined position and stops, the recording head 4 is driven in accordance with an image signal while the carriage 3 is moved in the main-scanning direction. Consequently, ink droplets are discharged onto the sheet 10 to perform recording row by row. The serial-type inkjet recording apparatus 1 receives a recording end signal or a signal indicating arrival of the trailing end of the sheet 10 at the recording area. Accordingly, the recording operation is ended to eject the sheet 10 onto a sheet ejection tray.

Next, an outline of a controller of the serial-type inkjet recording apparatus 1 will be described with reference to FIGS. 2A and 2B. FIG. 2A is a block diagram of a configuration of a controller 100 of the image forming apparatus. FIG. 2B is a functional block diagram of a main controller 100A. That is, the controller 100 includes the main controller (computer) 100A having, for example, a central processing unit (CPU) 101 that controls the entire apparatus, a read only memory (ROM) 102 in which programs to be executed by the CPU 101, and other fixed data are stored, and a random access memory (RAM) 103 in which image data and the like are temporarily stored.

The controller 100 includes a host interface (I/F) 106 that transfers data to and from a host (information processing apparatus) 200 such as a personal computer (PC), an image output controller 111 that controls the driving of the recording head 4, and an encoder analyzer 112. The encoder analyzer 112 inputs and analyzes detection signals from the main-scanning encoder sensor 24 and the sub-scanning encoder sensor 26. The controller 100 also includes a main-scanning motor driver 113 that controls the driving of the main-scanning motor 5, a sub-scanning motor driver 114 that controls the driving of the sub-scanning motor 16, an input-and-output (I/O) unit 116 in between with various sensors and actuators 117, and the like. Moreover, the controller 100 includes a droplet detection unit 131 that detects discharge/non-discharge by the discharge detector 30.

The image output controller 111 outputs a drive waveform, a head control signal, print image data, and the like to a head driver 110 being a head drive circuit for driving the recording head 4 mounted in the carriage 3 to discharge droplets from the nozzles of the recording head 4 in accordance with the print image data. The image output controller 111 has, for example, a drive waveform generator that generates a drive waveform for controlling the driving of the recording head 4 and a data transmitter that transfers a head control signal for selecting a predetermined drive signal from the drive waveform, and print image data.

The encoder analyzer 112 includes a direction detector 120 that detects the movement direction of the carriage 3 from a detection signal, and a counter 121 that detects the movement amount of the carriage 3. The controller 100 controls the driving of the main-scanning motor 5 via the main-scanning motor driver 113 based on the analysis result from the encoder analyzer 112, and thus controls the movement of the carriage 3. Moreover, the controller 100 controls the driving of the sub-scanning motor 16 via the sub-scanning motor driver 114, and thus controls the feeding of the sheet 10.

The main controller 100A of the controller 100 is a computer, and corresponds to an image degradation compensator to compensate for image degradation according to the present disclosure. As illustrated in FIG. 2B, the main controller 100A (the CPU 101) includes a first image compensator 101A, a threshold comparator 101B, and a second image compensator 101C. For values not greater than at least the threshold among the pixel values corresponding to defective discharge nozzles, discharge from the defective discharge nozzles is stopped in converting multi-valued data of an input image into n-value data (n≥2). The first image compensator 101A executes a processing of spreading a quantization error, which is caused by the stop of the discharge in converting the multi-valued data of the input image into the n-value data (n≥2), to neighboring pixels of a pixel corresponding to a defective discharge nozzle. The threshold comparator 101B compares a pixel value corresponding to the defective discharge nozzle and a predetermined threshold. The second image compensator 101C further executes a processing of replacing a small dot among dots around the defective discharge nozzle with a large dot by pattern matching with use of a predetermined pattern in accordance with the dot shape and placement around the defective discharge nozzle, on condition that as a result of the comparison, the pixel value corresponding to the defective discharge nozzle is equal to or more than the threshold. Note that the main controller 100A reads programs to realize these functional units with a function implementation unit generated by the CPU 101. When detecting droplet discharge of the recording head 4, the main controller 100A also performs control of moving the recording head 4, causing the recording head 4 to discharge a droplet from a predetermined nozzle, and determining a droplet discharge state based on a detection signal from the droplet detection unit 131.

Next, a description will be given regarding image data processing (a processing of compensating for image degradation) to be executed by the above-described main controller 100A of the serial-type inkjet recording apparatus 1. That is, in a procedure for the processing, firstly, the droplet discharge state is determined, that is, the presence or absence of a defective discharge nozzle is detected. Specific examples of the detection and check may include any known method, for example, a method in which ink droplets are discharged onto a paper surface such as a nozzle check pattern, or a method in which an ink droplet is detected by the droplet detection unit 131 provided in the serial-type inkjet recording apparatus 1. The detection method is not particularly limited.

Moreover, in the detection timing, there are two types of methods of a method in which a defective discharge nozzle is detected after print image data is input, and a method in which a defective discharge nozzle is detected before print image data is input. The former method has an advantage that it is possible to ensure detection and compensation when a defective discharge nozzle exists, because the defective discharge nozzle is detected after print image data is input and immediately before printing. However, the former method has a disadvantage that it takes time to actually start printing after a print start key is pressed, because it is necessary to perform a detection determination processing after print image data is input.

On the other hand, the latter method has an advantage that there is no waiting time for actual start of printing after the print start key is pressed, because the presence or absence of a defective discharge nozzle is detected before print image data is input. However, the latter method has a disadvantage that when there is a lapse of time between detection and printing, if the defective discharge nozzle is recovered or, conversely, the number of defective discharge nozzles is increased, it is not possible to deal with it. Therefore, it is important to obtain information on the presence or absence of a defective discharge nozzle by performing discharge detection, in view of their respective advantages and disadvantages.

Next, information on which nozzle is a defective discharge nozzle is checked against a print quality upon printing image data to check which pixel of recording pixels matches (corresponds to) the defective discharge nozzle on a pixel-by-pixel basis. As a result, a processing of generating no dot (setting the n-value data to zero) upon the subsequent n-value conversion is performed on the pixel that has been determined "to be recorded by a defective discharge nozzle." The quantization error is spread to the neighboring pixels to be recorded by normal-discharge nozzles. The placement (density) of ink droplets to be discharged normally and their sizes are changed. Consequently, the density around the defective discharge nozzle is made constant to mitigate the influence of the defective discharge nozzle.

Note that even when a pixel for which a dot is not allowed to be generated exists in the above-mentioned detection and check, an effect of an improvement in image quality due to a change of one dot is large when the dot density is low and a light color is represented. Hence, the effect of the improvement can be expected only from the compensation processing on the downstream side of the defective discharge nozzle. However, for example, a sufficient improvement (compensation) effect in image quality cannot be expected in an image where ink droplets cover a recording medium as in an image like a solid image with a high dot density when the compensation processing cannot be performed on the upstream side of the defective discharge nozzle.

Then, in the serial-type inkjet recording apparatus 1 (the main controller 100A), when the pixel value of a target pixel is less than a predetermined "threshold" set arbitrarily, image processing in which a quantization error in multi-valued error diffusion processing is spread as it is to neighboring pixels is executed as the image data compensation processing. On the other hand, when the pixel value of the target pixel is higher than the threshold, it is determined that the compensation processing by spreading of a quantization error by multi-valued error diffusion processing is not sufficient. In that case, pattern matching is performed by a comparison of the dot shape and placement around the target pixel corresponding to the defective discharge nozzle and a predetermined mask pattern. Image processing in which a small dot is replaced with a large dot having the image quality improvement effect is executed. That is, when the pixel value of a target pixel is equal to or more than the threshold, a procedure in which the coordinates of the pixel are stored, and pattern matching is performed based on the stored coordinates after the end of multi-valued error diffusion processing is adopted.

The threshold used in the above-described processing is a plurality of thresholds that can be set according to the type of paper to be used. That is, the threshold used in the above-described processing can be changed according to the type of paper to be used. In practice, a sheet having a tendency of ink bleeding (what is called a plain paper and the like) has a high image quality improvement effect without the image compensation on the upstream side of a defective discharge nozzle because of the ink bleeding. Accordingly, it is possible to set a high threshold. On the other hand, for a coated paper whose surface is coated, and the like, ink is reduced in dot diameter due to the influence of the coated surface. Hence, it is considered that the improvement effect is small without the image compensation on the upstream side of the defective discharge nozzle, and it is necessary to set a low threshold.

Figure 3B:
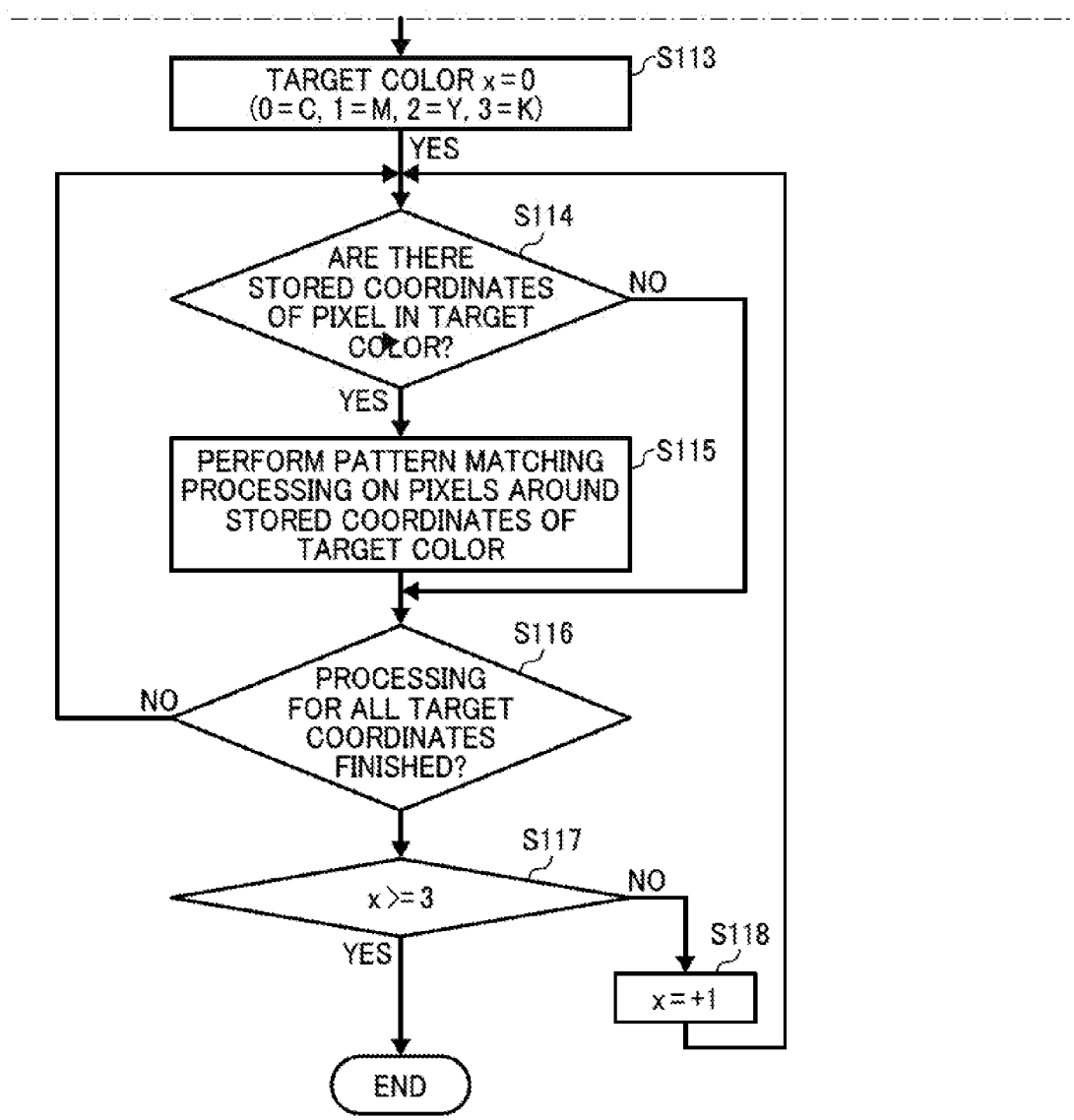

FIG. 3 is a flow chart of a procedure of image data compensation processing to be executed in the main controller 100A based on a program when a defective discharge nozzle is detected. Note that the program is recorded in a well-known or known computer-readable recording medium (particularly referred to here as "program recording medium" in order to distinguish it from a recording medium including a sheet). In the serial-type inkjet recording apparatus 1, input image data for one scan that is performed by moving the carriage 3 is input to the main controller 100A of the serial-type inkjet recording apparatus 1 to start the compensation processing. The input image data is data of a CMYK color space which has been converted from a RGB color space. In other words, the input image data is image data having four pixel values of CMYK in a single pixel position. The conversion from a RGB color space into a CMYK color space may be performed with a printer driver 201 of the host 200 or inside the serial-type inkjet recording apparatus 1. Firstly, the main controller 100A sets the coordinates of a target pixel for the image compensation processing (S101). Next, the main controller 100A sets a target pixel color of the pixel at the set coordinates. To set the target pixel color to C, M, Y, and K in turn, for example, the main controller 100A sets the target color to cyan, magenta, yellow, and black in the cases of x=0, 1, 2, and 3, respectively. At S102, first, the main controller 100A sets x=0, that is, the pixel of cyan to a target of the determination. Next, the main controller 100A determines (or checks) whether the target pixel is a pixel to be recorded by a defective discharge nozzle (S103). Here, when the target pixel is a pixel to be recorded by a defective discharge nozzle (YES at S103), the main controller 100A causes no dot to be generated for the pixel (sets the n-value data to zero) (S104). The main controller 100A determines whether the pixel value (tone value) of the target pixel in the input image data is equal to or more than a predetermined threshold (S105). The term "pixel value (tone value)" used herein represents a tone value for each color, which is represented by a number of from 0 through 255. For example, for the coordinates of 200 in cyan, 40 in magenta, 200 in yellow, and 100 in black, when x=90, at S105 the main controller 100A determines whether the pixel value of 200 in cyan to be equal to or more than the predetermined threshold.

When the pixel value of the target pixel is equal to or more than the predetermined threshold (YES at S105), the main controller 100A saves the coordinates of the target pixel into memory (S106), and proceeds the process to step S107. Alternatively, when the target pixel is not a pixel to be recorded by a defective discharge nozzle at step S103 (NO at S103), the main controller 100A performs multi-valued error diffusion processing to generate a dot (or sets n-value data to the target pixel) (S107). The main controller 100A proceeds the process to step S108. The main controller 100A updates a quantization error (an error caused when a pixel is quantized) at step S108 (S108) to spread neighboring pixels recorded by normal discharge nozzles. Next, the main controller 100A determines whether the determination has been finished for all the colors (whether x is three or greater) (S109). When the determination has not been finished for all colors (NO at S109), the main controller 100A increments x up by one (S110), in other word, shifts the target color to the next color, and repeats the steps from S103. When the determination has been finished for all colors (YES at S109), the main controller 100A determines whether the n-value conversion processing (the processing of converting multi-value image data into n-value image data) has been finished for all the colors (S111). Here, when there is a pixel for which the n-value conversion processing has not been finished (NO at S111), the main controller 100A shifts (changes) the target pixel (S112), and repeats the process from step S101.

When the n-value conversion processing for all the pixels has been finished (YES at S111), the main controller 100A determines whether there is a stored pixel (coordinates) for each color (S110). First, the main controller 100A sets the target pixel color to cyan (x=0) (S113). Next, the main controller 100A determines whether there is a stored pixel (coordinates) in the target color (S114). When there is a stored pixel (YES at S114), the main controller 100A performs the pattern matching processing on neighboring pixels of the stored pixel in the image of the target color (S115), and proceeds the process to step S116. When there is no stored pixel at step S114 (NO at S114), the main controller 100A proceeds the process to step S116 directly. Here, when the pattern matching processing has been finished for all the target pixels of the target color (YES at S116), the main controller 100A determines whether the pattern matching processing has been finished for all the colors (whether x is equal to or greater than 3) (S117). When the pattern matching processing has not been finished for all the colors (NO at S117), the main controller 100A increments x up by one (S118), in other word, shifts the target color to the next color, and repeats the steps from S114. When the processing for all the colors has been finished (S117, Yes), the main controller 100A outputs print image data for one scan, and finishes the process.

Figure 4:
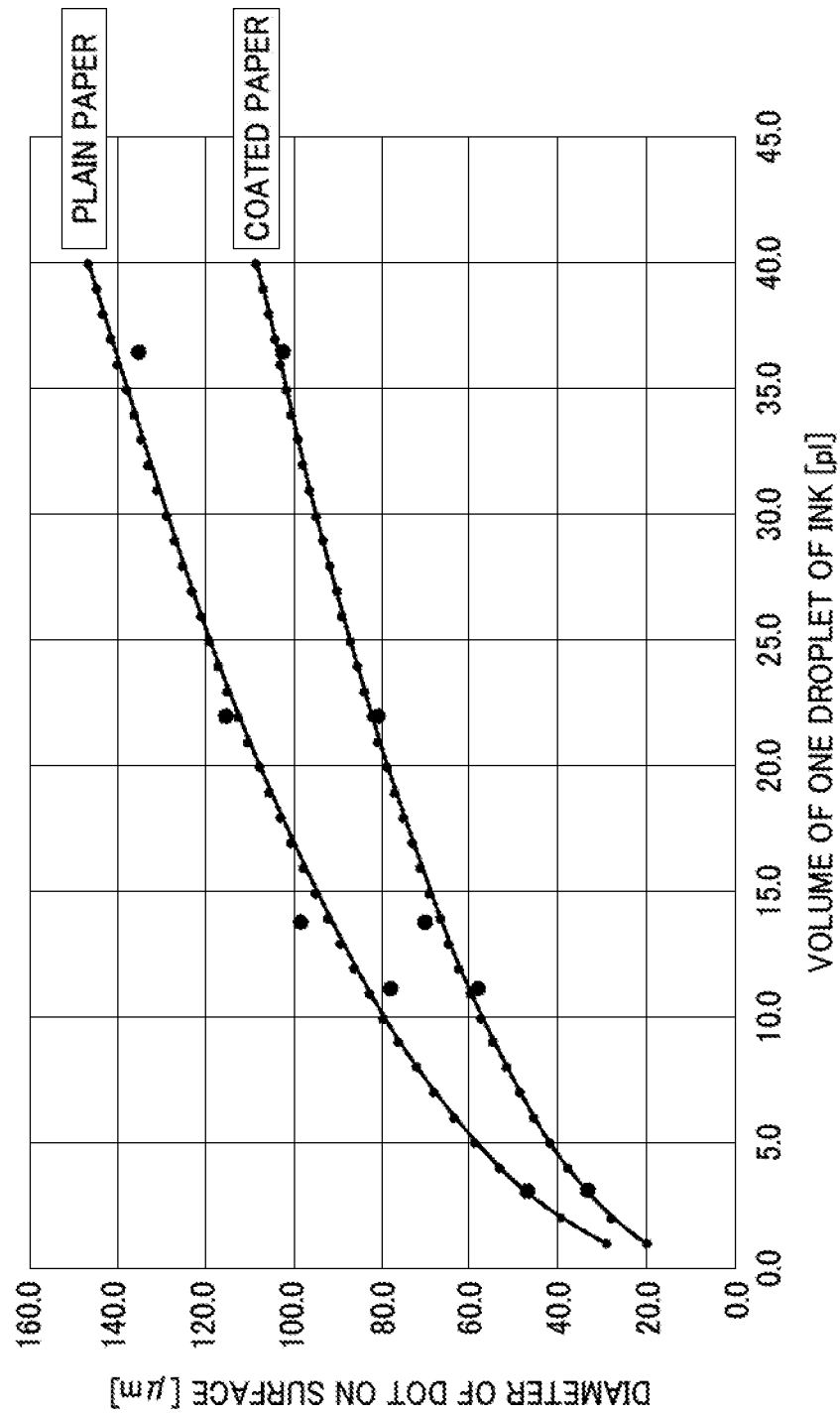
FIG. 4 is an illustration of the difference of a dot diameter on a sheet of paper, in which the vertical axis represents the dot diameter on the paper surface and the horizontal axis represents the volume of one ink droplet, according to an embodiment of the present disclosure.

FIG. 4 is an illustration of the difference of a dot diameter (dot size) on the sheet 10 (the difference between papers, here, the difference of a dot diameter on the surface (paper surface) between a plain paper and a coated paper), in which the vertical axis represents the dot diameter ($\mu$m) on the paper surface and the horizontal axis represents the volume (pl) of one ink droplet. That is, the plain paper always has a larger dot diameter on the sheet surface than the coated paper irrespective of the volume per ink droplet. In addition, there is observed a tendency of increase in the difference as increase in the volume per ink droplet. Here, the threshold used to determine the pixel value is preset not only for the above-described type of paper, but also for the dot shape (size) and placement (density) after performing multi-valued error diffusion processing to convert multi-valued data into the n-value data (an integer of n≥2). It is also possible in multi-valued error diffusion processing to preset the threshold to a different value depending on a tone at which the density and dot placement that reduces the image improvement effect are obtained.

The threshold used to determine the pixel value of a target pixel may be set according to the density of ink to be used in a printing device. For example, Y (yellow) and the like are high in brightness and low in visibility. Accordingly, even when the target pixel corresponds to a defective discharge pixel, it is difficult to recognize it. Hence, it is possible to set a large switching threshold for Y. By contrast, K (black) is high in visibility. Accordingly, the threshold (switching threshold) of a pixel value used to determine "to be recorded by a defective discharge nozzle" is set to a smaller value than Y. In this manner, the threshold can be changed depending on the type of paper (the type of recording medium), the ink color, the ink density of the ink discharged normally, and the dot shape and placement around the defective discharge nozzle after multi-valued error diffusion processing.

Next, a description will be given regarding the replacement of dots by a mask pattern at step S115 of FIG. 3. At this step, although the dot size corresponds to a value of n-value data, the dot size is used for convenience of description.

FIGS. 5A to 5C and 6A to 6C are illustrations of the replacement of dots by a mask pattern in the present embodiment. Note that the mask pattern is a plurality of patterns that is formed and used for each dot size in accordance with, for example, the dot placement around a defective discharge nozzle. FIG. 5A is an illustration of an example of a mask pattern for dot replacement (here, a pattern to convert the second smallest dots of defective discharge nozzles with one level larger dots). FIG. 5B is an illustration of an image before the replacement (the bold line indicates a pattern matching implementation area). FIG. 5C is an illustration of an image after the replacement (the bold line indicates the pattern matching implementation area).

A description is given here, assuming that n in the n-value (n≥2) conversion is a total of four values (n=4) of dot diameters of three types of sizes, and no droplet. Note that here, for the sake of convenience, the size of a dot is classified by "diameter;" however, the dots only need to be, for example, a large droplet, a medium droplet, and a small droplet, and it is not necessarily the gist to restrict the dot to a round one. The dot replacement by a mask pattern (pattern matching) is performed depending on the presence or absence of the coordinates stored as a target pixel (the coordinates of a pixel) as described in the flow diagram of FIG. 3. That is, when the coordinates of a pixel are not stored, pattern matching is not performed. However, in this case, the compensation processing is performed on a defective discharge nozzle based on multi-valued error diffusion processing. Accordingly, it is possible to obtain a printing result where image quality has been improved.

On the other hand, when the coordinates of a pixel are stored, a preset mask pattern M1 (FIG. 5A) is prepared. Here, the preset mask pattern M1 converts the second (or the second) smallest dot diameter among the dot diameters of three types of sizes into the largest dot diameter. In addition, pattern matching is performed between the mask pattern M1 and the n-value image data (FIG. 5B) after multi-valued error diffusion processing. Here, when the mask pattern M1 matches the image data, the dot replacement is performed.

That is, the mask pattern M1 of FIG. 5A corresponds to 3×4=12 nozzles. Of them, a gray portion corresponds to a defective discharge nozzle and indicates no dot, a diagonally shaded portion indicates dot replacement (in the illustrated example, the replacement is performed every other dot in the top and bottom rows), and a white portion indicates no replacement. Specifically, in the pattern matching implementation area indicated by the bold line in the n-value (here, four-valued) image data illustrated in FIG. 5B (that is, the area of the mask pattern M1 when pixels corresponding to defective discharge nozzles are matched with defective discharge nozzle matching portions of the mask pattern M1), pattern matching is performed between the mask pattern M1 of FIG. 5A and the n-value image data.

As a result, as illustrated in FIG. 5C, within the image data of FIG. 5B, the second smallest dot second from the left in the third row from the top is targeted for replacement in a first implementation area A1. As illustrated in FIG. 5C, the dot is replaced with the largest dot. The mask pattern does not match the image data in a second implementation area A2 and, accordingly, the replacement is not performed. In a third implementation area A3, the second smallest dot at the left end in the first row from the top, the dots second and fourth from the left in the third row are replaced with the largest dots as illustrated in FIG. 5C. In this manner, the image is converted into a dot pattern having the compensation effect for neighboring pixels of a pixel corresponding to a defective discharge pixel (FIG. 5C). Here, as mentioned above, four dots are replaced with the largest dot diameter.

Moreover, the above-described mask pattern is used for the dot placement after multi-valued error diffusion processing for the n-value (n≥2) conversion. Accordingly, a mask pattern can be set according to each dot size after the n-value conversion. Moreover, dots can also be replaced using a mask pattern M2 illustrated in FIG. 6A, concurrently using the mask pattern M1 illustrated in FIG. 5A. In this manner, the influence of the defective discharge nozzle can be further mitigated.

Figure 6A:
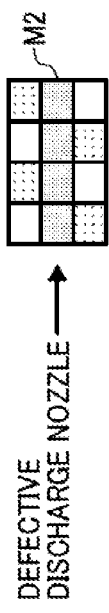
FIGS. 6A to 6C are illustrations of the replacement of dots by a mask pattern according to an embodiment of the present disclosure.
Figure 6B:
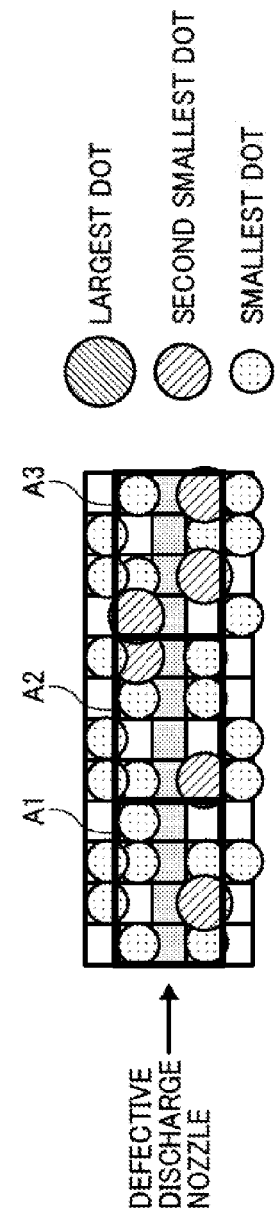
Figure 6C:
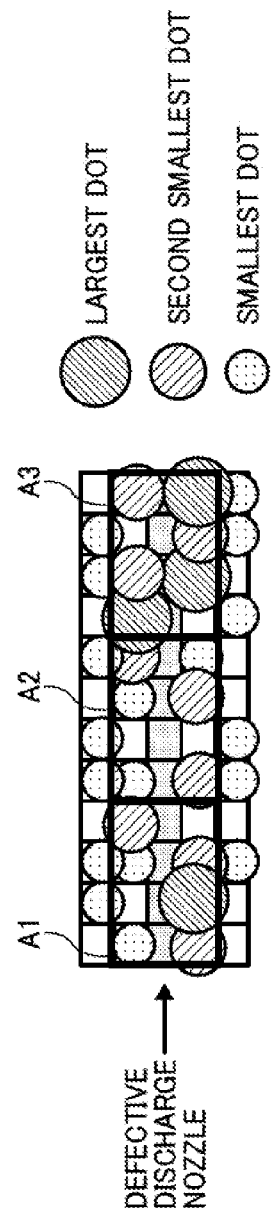

That is, FIG. 6A is a diagram illustrating the mask pattern M2 that converts the smallest dots into the second (second) smallest dots. FIG. 6B is a diagram illustrating an image before the replacement (the bold line indicates the pattern matching implementation area by the pattern illustrated in FIG. 6A). FIG. 6C is a diagram illustrating an image (the bold line indicates the pattern matching implementation area) after both the replacement by the mask pattern M1 of FIG. 5A and the replacement by the mask pattern M2 of FIG. 6A. Note that the mask pattern M2 is only different from the mask pattern M1 in the pattern and size upon dot replacement, and is the same as the mask pattern M1 in the other points described above.

Here, the mask patterns M1 and M2 are simultaneously applied to the same four-valued image data as that of FIG. 5B. As a result, in addition to the above-described dot replacement by the mask pattern M1 illustrated in FIG. 5C, the dot replacement by the mask pattern M2 is further performed, and the dots in FIG. 6C can be obtained. Specifically, the dots first and third from the left in the third row from the top which match the mask pattern M2 in the first implementation area A1, the dot third from the left in the third row in the second implementation area A2, and the dots second and fourth from the left in the first row and third from the left in the third row in the third implementation area A3 are respectively replaced with the second smallest dots from the smallest dots.

In the present embodiment, as described above, an input image is converted into a dot pattern by multi-valued error diffusion processing where multi-valued data of the input image is converted into the n (n≥2) value. Droplets are not allowed to be discharged for pixels corresponding to recording positions of defective discharge nozzles from which a droplet cannot be discharged normally, based on the discharge state (normal discharge or discharge failure) from the nozzles of the recording head. Moreover, together with this, in order to compensate for image degradation due to a defective discharge nozzle, a case where image degradation can be compensated by multi-valued error diffusion processing using a predetermined threshold are separated from a case where image degradation cannot be compensated by multi-valued error diffusion processing using a predetermined threshold are separated. The threshold can be set by changing the pixel value of a pixel corresponding to a recording pixel position of a defective discharge nozzle, for each sheet in accordance with the density (tone value) of a print image, dot density, and the like In this manner, image processing where a quantization error in multi-valued error diffusion processing is spread as it is to neighboring pixels, and the pattern matching processing with a mask pattern formed in advance in accordance with the dot shape and placement around a defective discharge nozzle are performed. Hence, image processing having a high compensation effect can be performed at all tones for the pixel corresponding to the defective discharge pixel.

Variation In the above-described embodiment, when the target pixel is a pixel to be recorded by a defective discharge nozzle, the main controller 100A does not perform the multi-valued error diffusion processing. By contrast, in this variation, even when the target pixel is a pixel to be recorded by a defective discharge nozzle, the main controller 100A does not perform the multi-valued error diffusion processing on a target pixel if the target pixel has a tone value equal to or more than a predetermined threshold. When the main controller 100A performs pattern matching, the main controller 100A deletes a dot for the target pixel as a result of the pattern matching.

Figure 7B:
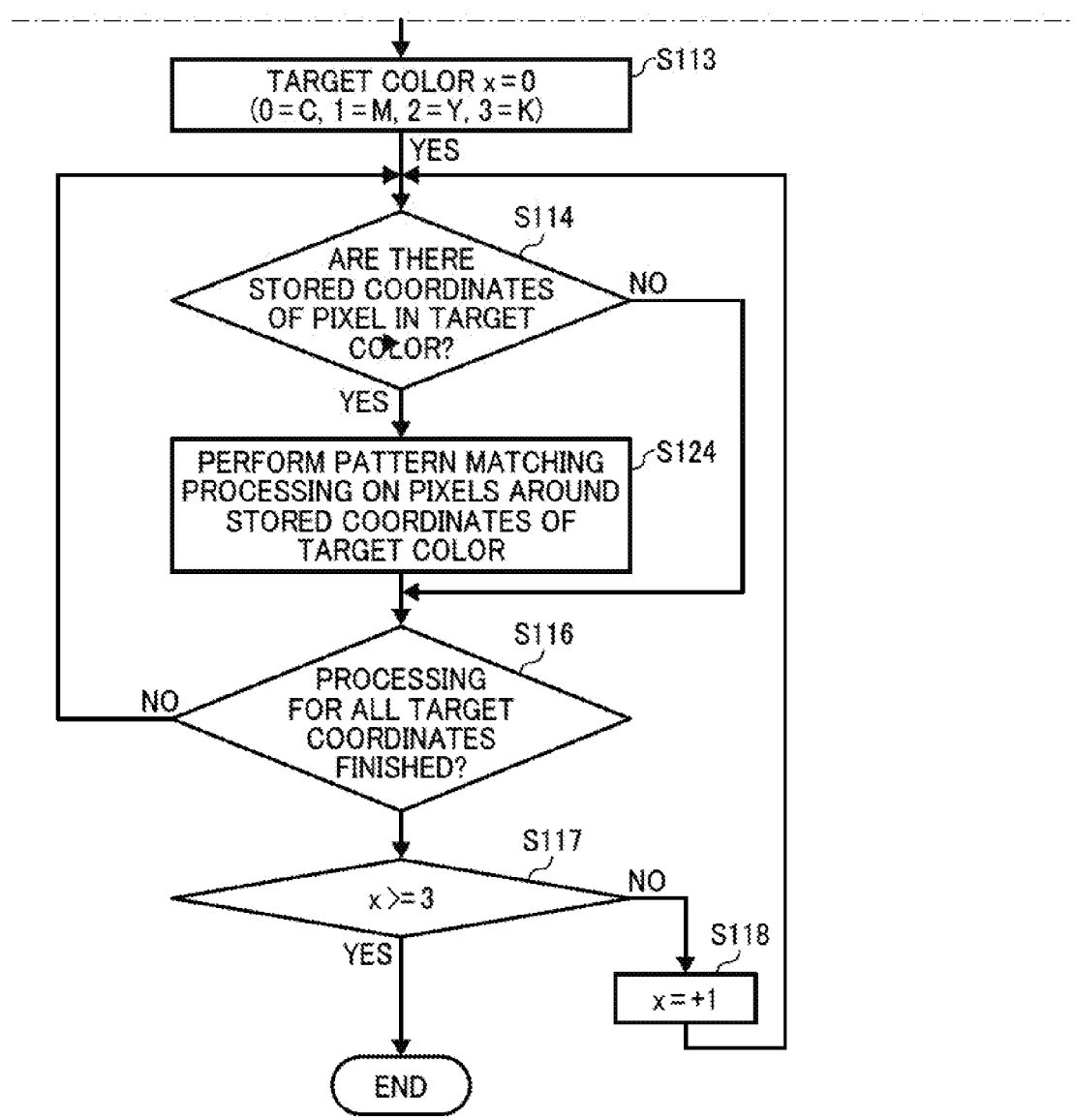

FIG. 7 is a flow chart of a procedure of the variation of the image data compensation processing. The same reference codes are allocated to the same steps as the steps of the flow chart illustrated in FIG. 3 according to the above-described embodiment, and descriptions of the same steps are omitted below. In this variation, the main controller 100A performs processing of the steps S101 through S103 in the same manner as in the above-described embodiment. When a target pixel is a pixel to be recorded by a defective discharge nozzle, at S121 the main controller 100A determines whether the pixel value (tone value) of the target pixel is equal to or more than a predetermined threshold. The pixel value in this variation is defined in the same manner as in the above-described embodiment. When the pixel value is equal to or more than the predetermined threshold (YES at S121), at S122 the main controller 100A performs multi-valued error diffusion processing and allows generation of a dot (n-value data). At S106, the main controller 100A stores the coordinates of the target pixel in the memory in the same manner as in the above-described embodiment. When the pixel value is less than the predetermined threshold (NO at S121), at S123 the main controller 100A performs multi-valued error diffusion processing and does not allow generation of a dot (n-value data). The steps of S107 through S114 are the same as the steps of S107 through S114 in the above-described embodiment, and descriptions of the steps of S107 through S114 are omitted below.

When there is a stored pixel (coordinates) in a target color (YES at S114), the main controller 100A performs the pattern matching processing on neighboring pixels of the stored pixel in the image of the target color (S115), and proceeds the process to step S116. Here, this variation differs from the above-described embodiment in that n-value data is also set to the stored pixel and the value of stored pixel is set to zero as a result of pattern matching. The steps of S116 through S119 are the same as the steps of S116 through S119 in the above-described embodiment, and descriptions of the steps of S116 through S119 are omitted below.

In this variation, as described above, multi-valued data of an input image is converted into n-value data by multi-valued error diffusion processing compatible with n-value data (n≥2). For pixels corresponding to recording positions by defective discharge nozzles from which droplets are not discharged, a case where image degradation can be compensated by multi-valued error diffusion processing using a predetermined threshold and a case where image degradation cannot be compensated by multi-valued error diffusion processing using a predetermined threshold are distinguished to compensate for image degradation due to the defective discharge nozzles based on discharge states of nozzles of the recording head. When image degradation is not compensated by the multi-valued error diffusion processing, the pattern matching processing with a mask pattern formed in advance in accordance with the dot shape and placement around a defective discharge nozzle are performed. As a result, neighboring pixels are replaced to compensate image degradation. Such a configuration allows image processing having a high compensation effect to be performed at all tones for the pixel corresponding to the defective discharge pixel.

Note that, in the above-described embodiment, the main controller 100A reads programs to functionally implement the first image compensator 101A, the threshold comparator 101B, and the second image compensator 101C in the CPU 101. Alternatively, the image forming apparatus may include hardware to achieve the functions of the first image compensator 101A, the threshold comparator 101B, and the second image compensator 101C in the CPU 101. In the above-described embodiment and variation, input image data are data of four colors of CMYK. Alternatively, when the number of color materials to be discharged by the inkjet recording apparatus is more than four, the determination may be performed based on the pixel values of the number of pieces of data corresponding to the number of the color materials. For single color printing, the determination may be performed based on the pixel value of one piece of data. In the above-described embodiment and variation, after n-value conversion process has been finished for all the pixels of an input image (YES at S111), pattern matching processing is performed. For example, the image forming apparatus may include line buffers by the number of lines required for the pattern matching processing at S115 and start the pattern matching processing in parallel without waiting the end of the n-value conversion processing for all the pixels when n-value conversion processing has been finished for pixels of the required number of lines. In other words, the processing of the first image compensator 101A, the threshold comparator 101B, and the second image compensator 101C may be executed in parallel.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An image forming apparatus, comprising:
   an image forming device including a recording head with nozzles to discharge a droplet to form an image on a recording medium;
   a threshold comparator configured to compare a pixel value corresponding to a defective discharge nozzle, from which a droplet is not normally discharged, and a predetermined threshold;
   a first image compensator configured to execute a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle; and
   a second image compensator configured to execute a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

2. The image forming apparatus according to claim 1, further comprising:
   a memory; and
   an image degradation compensator configured to compensate for image degradation,
   wherein the image degradation compensator is configured to perform a processing of storing, in the memory, coordinates of the pixel corresponding to the defective discharge nozzle on condition that the pixel value corresponding to the defective discharge nozzle is equal to or more than the predetermined threshold, and
   wherein the second image compensator executes the processing of replacing the smaller dot with the larger dot based on the stored coordinates of the pixel.

3. The image forming apparatus according to claim 2, wherein the threshold is settable in accordance with a type of recording medium.

4. The image forming apparatus according to claim 2, wherein the threshold is settable in accordance with a color of ink to be discharged onto the recording medium.

5. The image forming apparatus according to claim 1, wherein the threshold is settable in accordance with a density of a print image upon normal discharge of ink onto the recording medium.

6. The image forming apparatus according to claim 1, wherein the threshold is settable in accordance with a dot shape and placement around the defective discharge nozzle in a print image after the first image compensator executes the processing.

7. The image forming apparatus according to claim 1, wherein the second image compensator replaces dots corresponding to the n-value data after execution of the processing of the first image compensator, using a mask pattern for each dot size around the defective discharge nozzle.

8. An image processing method, comprising:
   discharging a droplet from a nozzle of a recording head to form an image on a recording medium;
   comparing a pixel value corresponding to a defective discharge nozzle, from which a droplet is not normally discharged, and a predetermined threshold;
   executing a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle; and
   executing a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

9. The image processing method according to claim 8, further comprising compensating for image degradation,
   wherein the compensating for image degradation includes executing a processing of storing, in a memory, coordinates of the pixel corresponding to the defective discharge nozzle on condition that the pixel value corresponding to the defective discharge nozzle is equal to or more than the predetermined threshold, and
   wherein the executing the processing of replacing the smaller dot with the larger dot includes executing the processing of replacing the smaller dot with the larger dot, based on the stored coordinates of the pixel.

10. A non-transitory computer-readable program recording medium storing a program for causing an image forming apparatus to execute an image processing method, the method comprising:
    discharging a droplet from a nozzle of a recording head to form an image on a recording medium;
    comparing a pixel value corresponding to a defective discharge nozzle, from which a droplet is not normally discharged, and a predetermined threshold;
    executing a processing of, for at least a pixel value less than the predetermined threshold among pixel values corresponding to defective discharge nozzles, setting a value of stopping discharge of a droplet from a defective discharge nozzle in converting multi-valued data of an input image into n-value data, where n is an integer of two or greater, and spreading a quantization error due to setting of the value of stopping discharge in converting the multi-valued data of the input image into the n-value data, to neighboring pixels of a pixel corresponding to a defective discharge nozzle; and executing a processing of replacing a smaller dot among dots around the defective discharge nozzle with a larger dot by pattern matching with use of a predetermined mask pattern in accordance with a dot size and placement around the defective discharge nozzle, on condition that as a result of comparison of the threshold comparator, the pixel value corresponding to the defective discharge nozzle is equal to or more than the predetermined threshold.

* * * * *